L. R. GILBERT.
AUTOMATICALLY ACTING MULTIPLE RECORD SUPPORTING TABLE.
APPLICATION FILED JUNE 26, 1914.
1,269,175.
Patented June 11, 1918.
3 SHEETS—SHEET 2.
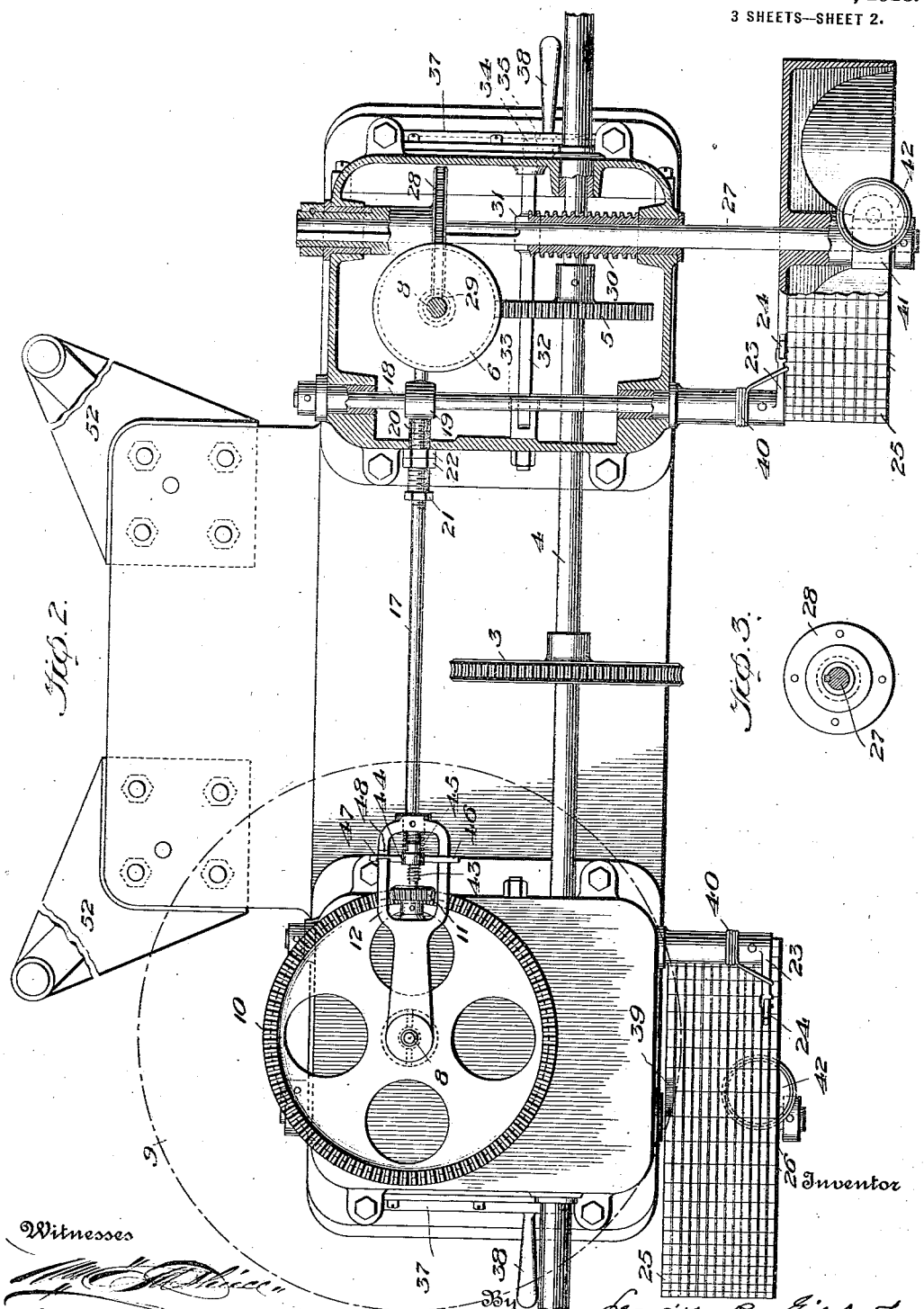

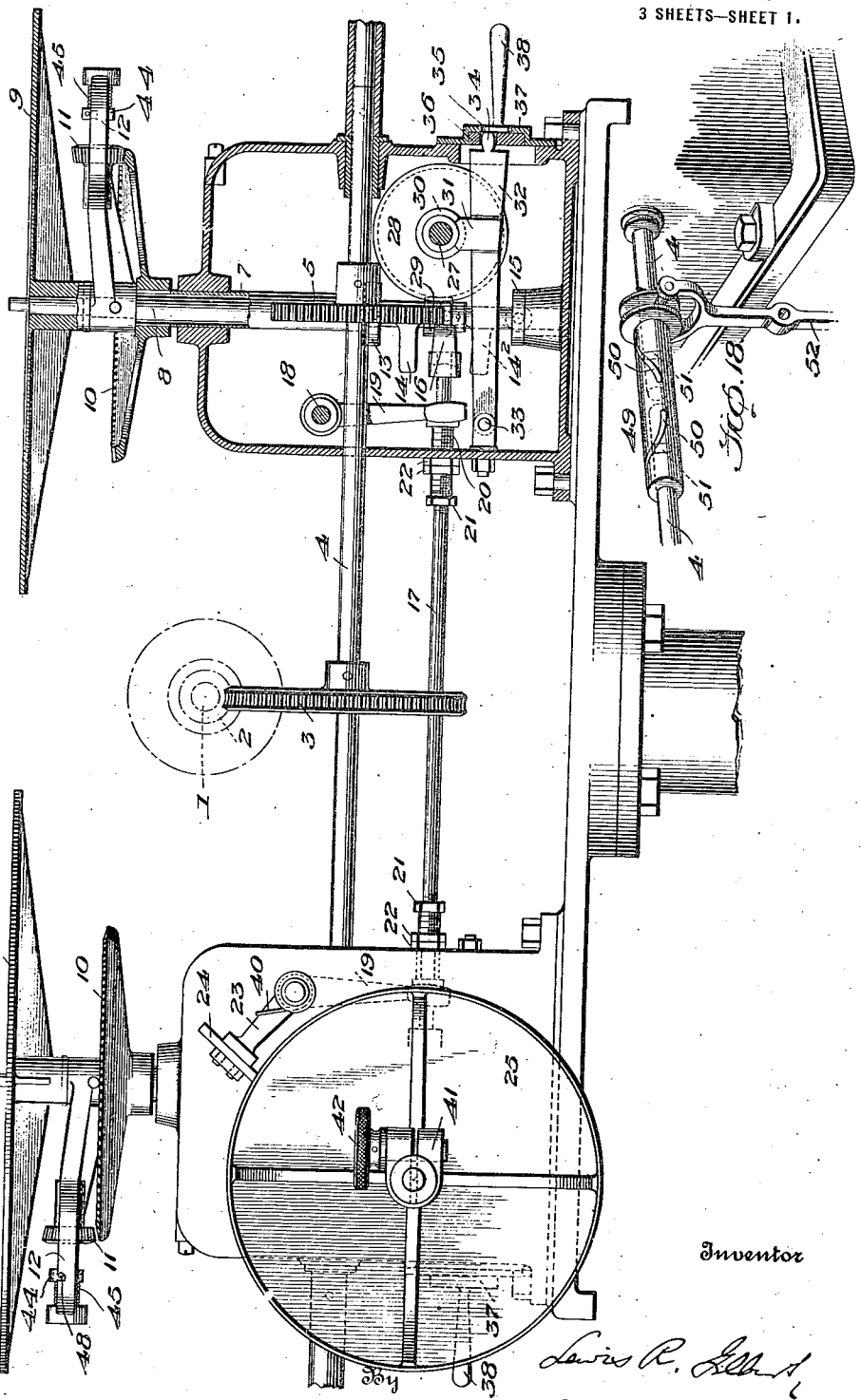

L. R. GILBERT.
AUTOMATICALLY ACTING MULTIPLE RECORD SUPPORTING TABLE.
APPLICATION FILED JUNE 26, 1914.
1,269,175.
Patented June 11, 1918.
3 SHEETS—SHEET 3.
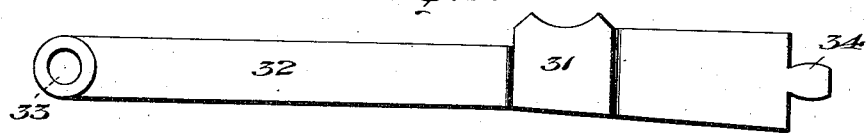
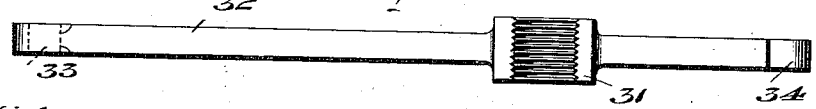
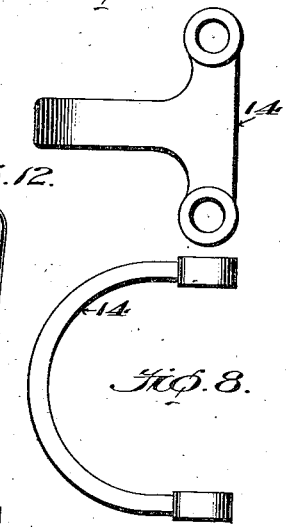
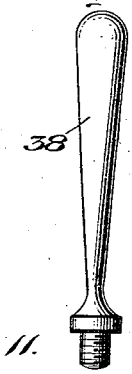
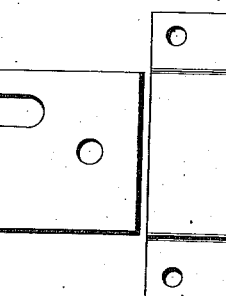
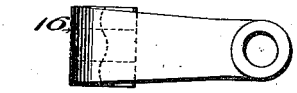
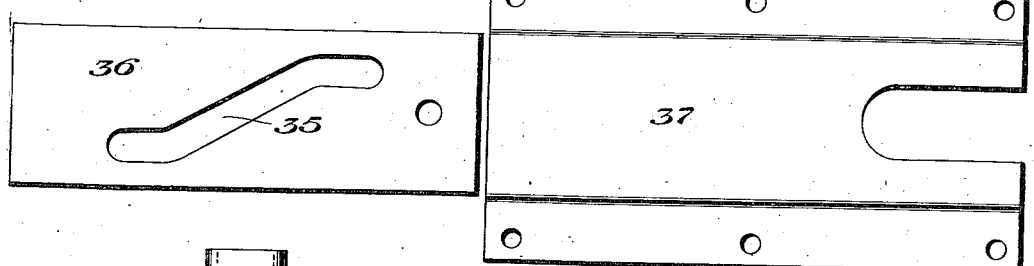
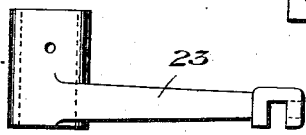
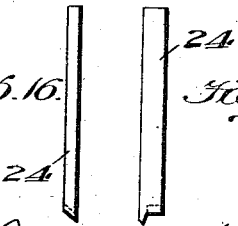

UNITED STATES PATENT OFFICE.

LEWIS RICHARD GILBERT, OF NEW YORK, N. Y., ASSIGNOR TO GEORGE REGESTER WEBB, OF BALTIMORE, MARYLAND.

AUTOMATICALLY-ACTING MULTIPLE-RECORD-SUPPORTING TABLE.

1,269,175. Specification of Letters Patent. Patented June 11, 1918.

Application filed June 26, 1914. Serial No. 847,462.

*To all whom it may concern:*

Be it known that I, LEWIS RICHARD GILBERT, a citizen of the United States, residing at New York city, in the county of New York and State of New York, have invented certain new and useful Improvements in Automatically-Acting Multiple-Record-Supporting Tables; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to tables for supporting sound reproducing records, and more particularly to that type of such tables in which one table with its record is automatically brought into operation at the time that another table and its record is thrown out of operation. The present invention contemplates a plurality of carrying tables coupled one with the other so that as one record is exhausted its table is brought to a state of rest and simultaneously another record-carrying table is automatically brought into action so that its record may be used for reproducing purposes and while being so used a new record may be placed on the other table, and so on in alternation, and thus making it possible to have practically a continuous reproduction from records without the annoyances incident to temporary cessation of sound reproduction. The present invention in its practical embodiment comprises a plurality of record carrying turntables, each constructed like the other, and one coupled to the other so that automatically one will be brought to a state of rest while the other is put in motion, each having associated with it a grooved drum calibrated to correspond with the grooves of the records and having a trigger coöperating with the drum so that when the record has reached its limit of reproduction the trigger will set parts in operation to stop the table whose record has become exhausted and simultaneously set in motion the other record carrying table whose trigger has been placed in position on its drum for action in manner similar to the trigger and drum of the other table, and so on in alternation from one table to the other. The invention furthermore contemplates the provision of a cushioning device which will absorb the shocks that otherwise might tend to disengage or shift the position of the reproducing needle in relation to the record or the position of engagement of the trigger with the calibrated drum. It furthermore contemplates a variable coupling between the record reproducing mechanism and the projector of a motion picture device so that the travel of the film of the motion picture device may be regulated or controlled to bring it into synchronism with the sound reproducing mechanism should the synchronism between the two devices be temporarily disturbed.

To the accomplishment of the foregoing and such other objects as may be made hereinafter to appear the invention consists in the several features hereinafter particularly described and then sought to be clearly defined by the claims, reference being had to the accompanying drawings forming a part hereof, and in which:

Figure 1 is a plan view of the apparatus, with parts in horizontal section;

Fig. 2 is a side elevation, with parts in vertical section;

Fig. 3 is a cross section through the drum shaft with its worm gear in full lines;

Fig. 4 a side view, and Fig. 5 a plan view of the arm carrying the sectional nut for the screw of the drum shaft;

Fig. 6 a front view of the rock shaft arm;

Fig. 7 a side view, and Fig. 8 a plan view of one of the quill lifting links;

Fig. 9 a plan view, and Fig. 10 a side view of the yoke which connects the two links;

Fig. 11 a side view of the cam-plate that raises and lowers the sectional nut carrying arm;

Fig. 12 a side view of the handle for manipulating the cam-plate;

Fig. 13 a side view of the cover for the cam-plate;

Fig. 14 a plan view, and Fig. 15 a side view of the trigger;

Fig. 16 an edge view and Fig. 17 a view at right angles thereto, of the trigger needle;

Fig. 18 a perspective of a portion of the casing of one table with the cam sleeve coupling two sections of the projector shaft with means for shifting the sleeve to accelerate or retard the film of the projector.

In the drawings the numeral 1 designates a shaft driven from an electric motor or other power source and having a worm 2 which meshes with a worm gear 3 on a shaft 4 which will be termed the projector shaft because it is designed to drive the projector of a motion picture machine (not shown). This shaft also drives, through mechanism to be described, the turn tables carrying sound reproducing records of which two such tables are illustrated and as the mechanism of each table is the same, the description of one will answer for both, and is as follows: To the projector shaft is connected a worm-gear 5 which meshes with a worm-gear 6 secured to a quill 7 encircling the upright rotatable shaft 8 which carries at its upper end the disk or plate 9 on which will be supported the reproducing record. To the upper end of the quill 7 is attached a latch-gear 10, so termed for convenience because when the quill is raised it coöperates with a latch comprising a pinion 11 mounted in the frame of an arm 12 rigidly connected to the turn table or record carrying shaft 8 so that when the gear and pinion are in mesh with each other the shaft carrying the record will be rotated, and at other times when the gear and pinion are not latched together the record and its carrying shaft will be at rest.

To effect the movement of the quill 7 for the above purpose a collar 13 at the lower end of the quill and encircling the shaft 8 has one end of a yoke-link 14 pivotally connected to it, the other end being pivotally connected to the adjacent end of a second yoke link 14² the other end of which is pivotally connected to a collar 15 of a bushing encircling the lower end of shaft 8, the meeting ends of the links being pivotally connected to a yoke 16 to which is attached one end of a rod 17 the other end of which is connected to the corresponding yoke of the other table so that as this rod is moved longitudinally the adjacent ends of the links of one table will be thrown in one direction so as to lift the quill and cause the latch gear and pinion of the arm 12 to latch or engage with each other to cause the table shaft to rotate as shown at the right of Fig. 7, while the corresponding links of the other table will be thrown or drawn in the other direction to cause the quill of that table to be lowered and the latch gear and pinion of that table to be unlatched or disengaged so that table will be at rest. When the connecting rod is moved in the other direction the table which was at rest will be thrown into action and the one that was in action will be brought to a state of rest, and so on in alternation as long as the machine is running.

For the purpose of shifting the connecting rod to produce the action above mentioned, each table is provided with a rock shaft 18 from which extends an arm 19 the fork end of which straddles the connecting rod and will contact with the head of a sleeve 20 having a threaded connection with the rod so as to be adjusted thereon for setting the throw of the forked arm, the sleeve being held to its adjustment by suitable means, for instance by the lock nut 21, and also provided with stop nuts 22 threaded to the exterior of the sleeve so as to limit the stroke of the rod.

The rock shaft 18 has connected to one end a trigger 23 provided with a blade or needle 24 which engages a spiral groove 25 formed in the periphery of a drum 26 attached to a shaft 27 journaled in suitable bearings in the casing of the table and having connected thereto a worm-gear 28 between which and the shaft is a feathered connection (shown in Fig. 3) to permit the shaft to turn therewith and also have a longitudinal movement in relation thereto, said gear meshing with a worm 29 attached to the turn-table shaft 8. The shaft 27 has also attached to it a screw 30 which is adapted to engage a sectional nut 31 carried by an arm 32 hinged at 33 to the casing of the table and having at its opposite end a stud 34 fitting in a camway 35 formed in a slidable-plate 36 inclosed by a cover 37 and provided with a handle 38 by which the cam-plate may be moved so as to raise or lower the arm 32 to make and break connection between its screw 30 and sectional nut 31. When the latch gear 10 is latched to the pinion 11 of the latch arm and the drum 26 is rotated, the record is rotated, and at the same time is moved longitudinally of the axis of its shaft by reason of engagement of its screw with the sectional nut mentioned so that the drum is given a rotary as well as a horizontal movement, thus causing the needle of the trigger to follow the spiral groove in the periphery of the drum, and when the needle reaches the end of the groove it drops into a recess or cut away portion 39 made in the drum, its movement being assisted by a spring 40, which also serves to hold the trigger needle in the groove, and as the trigger drops the shaft 18 rocks and its forked arm slides the connecting rod 17 so that the quill lowers and disengages the latch gear and its pinion and stops the rotation of the record carrying shaft and the drum while at the same time the other table is automatically set into operation by lifting of its quill and engagement of its latch gear and latch pinion, so that its record is rotated, and thus the operation is repeated during the running of the machine, the tables being alternately thrown into and out of action as specified.

When one table is brought to a state of rest as just mentioned, the spirally grooved drum is moved to its starting position by lowering the arm carrying the sectional nut by manipulation of the cam plate previously mentioned and then the shaft is slid back to its starting position and the sectional nut brought again into engagement with the screw of the shaft so that the parts will be in position for action when the record of the other table becomes exhausted and another record brought into action.

The spirally grooved drum is secured to its shaft by a clamp ring 41 encircling the split hub of the drum and controlled by a clamping screw 42. This enables the drum to be adjusted on its shaft both lengthwise thereof and circularly so as to bring the needle of the trigger to the groove and point of the groove in the drum corresponding to the position of the record reproducing needle in relation to the starting point of the record. It may be mentioned that the screw of the drum shaft has the same pitch as the spiral in the periphery of the drum, and that the spiral of the latter corresponds with the spiral of the record.

For the purpose of absorbing the shock incident to starting the rotation of the tables due to the latch gear while in motion being brought into engagement with latch pinion 11 while the latter is at rest, the pinion is mounted on a screw shaft or arbor 43 provided with a nut 44 between which and a suitable abutment and connected to both is a contractile spring 45, and the nut is provided with a transverse pin or rod 46 formed with a shoulder 47 which when the nut has traveled its limit will drop into a notch 48 formed in the frame of the arm 12 so as to lock the nut with the spring held under tension. With this cushion or shock absorber, when the latch gear is brought into mesh with the latch pinion the latter turns freely with the screw so as to feed forward the nut and gradually increase the tension of the spring so that the pinion is started under a spring tension or cushion that absorbs the shock otherwise liable to occur.

In combined motion picture and talking machines it not infrequently happens that the sound reproducing device and the picture projector get out of synchronism. To bring the two devices into synchronism without disturbing the sound reproducer, one section of the projector shaft 4 is connected to the other section of the shaft extending into the projecting machine by a sleeve coupling 49 formed with inclined or cam slots 50 into which pins 51 extending from the two sections of the projector shaft extend so that when the sleeve is caused to slide by a suitable lever, such as 52, the section of shaft which enters the projecting machine will be accelerated or retarded in its rotation, according to the direction in which the sleeve coupling is moved, and thus the picture film is advanced or restrained so as to restore synchronism between the projector and the sound reproducer.

Transmitters (not shown) will be supported on brackets 52 so that the needles carried by their arms will fit in the grooves of the records.

The operation of the several parts of the apparatus will be obvious from the foregoing description without repetition or amplification, and the advantages derived will be appreciated by those skilled in this art.

The preferred embodiment and details of the device have been fully illustrated and described but it is not the intention to limit the invention to the specific details set forth as changes may be made therein without departure from the essential features of the invention.

Having described my invention and set forth its merits what I claim is:—

1. A plurality of record-supporting tables, driving mechanism including coöperating toothed wheels for each table for rendering its record alternately active and inactive, a coupling connecting the driving mechanism of one table with like mechanism of the other table, means for automatically actuating said coupling to bring the record of one table to a state of rest and give motion to the record of the other table, and a shock absorbing device associated with one of the coöperating toothed wheels of the driving mechanism to take up the shock incident to initial intermeshing of the teeth of the two wheels.

2. A plurality of record-supporting tables, driving mechanism for each table for rendering its record alternately active and inactive, a coupling connecting the driving mechanism of one table with like mechanism of the other table, a trigger connected with said coupling, and a drum coöperatively related to said trigger and serving to hold the trigger in one position while a record is in action and to release the trigger when the record is to be brought to a state of rest and the record of the other table is to be made active.

3. A plurality of record-supporting tables, driving mechanism for each table for rendering its record alternately active and inactive, a coupling connecting the driving mechanism of one table with like mechanism of the other table, a trigger connected with said coupling, a rotatable drum coöperatively related to said trigger and serving to hold the trigger in one position while a record is in action and to release the trigger when the record is to be brought to a state of rest and the record of the other table is to be made active, and means for moving said drum in one direction relatively to said trigger while rotated in another direction.

4. In a talking machine, driving mechanism for rendering the record alternately active and inactive, a trigger and means connecting it with the driving mechanism, a rotatable drum coöperatively related to the trigger and serving to hold it in one position while the record is active and to release it when the record is to be brought to a state of rest, said drum being adjustable circularly and horizontally for setting with reference to the point of contact of the trigger therewith, and means for moving said drum in one direction relatively to the trigger while in rotation.

5. In a talking machine, driving mechanism for rendering the record alternately active and inactive, a trigger and means connecting it with the driving mechanism, a rotatable drum coöperatively related to the trigger and serving to hold it in one position while the record is active and to release it when the record is to be brought to a state of rest, means for feeding the drum horizontally in relation to the trigger while being rotated, and means for releasing the feeding means to permit the drum to be restored to its starting position.

6. In a talking machine, a rotatable shaft carrying a record supporting member, and a worm, an arm secured to said shaft and provided with a pinion, a quill slidable on said shaft and provided at its upper end with a gear to mesh with said pinion and at a lower point with a gear, a drive shaft provided with a gear meshing with the gear of said quill, a feathered shaft having a worm-gear meshing with the worm of the record carrying shaft, a drum mounted on the feathered shaft, a screw on the latter shaft, a nut arranged to be engaged and disengaged with said screw for feeding the drum shaft, and a trigger in operative relation to said drum, and connections between it and the quill shaft to stop the rotation of the record and the drum when the trigger is released from the drum and to rotate the record and drum while the trigger is in operative engagement with the drum.

7. In a record supporting table, a rotatable shaft carrying a record-supporting member and provided with an arm carrying a pinion, a driven gear arranged to engage the pinion for rotating the record carrying shaft, and a shock absorbing device associated with said pinion to take up the shock incident to starting the rotation of the record-carrying shaft.

8. In a record-supporting table, a rotatable shaft carrying a record-supporting member and provided with an arm carrying a pinion, a driven gear coöperating with said pinion for rotating the record-carrying shaft, and a shock absorber associated with said pinion and comprising a threaded shaft rotatable with the pinion, a nut traveling on the threaded shaft, a spring whose tension is increased by said nut, and means to lock the nut with the spring under tension.

In testimony whereof I affix my signature in presence of two witnesses.

LEWIS RICHARD GILBERT.

Witnesses:
WILLIAM HEIMILLE,
WILLIAM PEPPER CONSTABLE.